United States Patent Office 3,454,871
Patented July 8, 1969

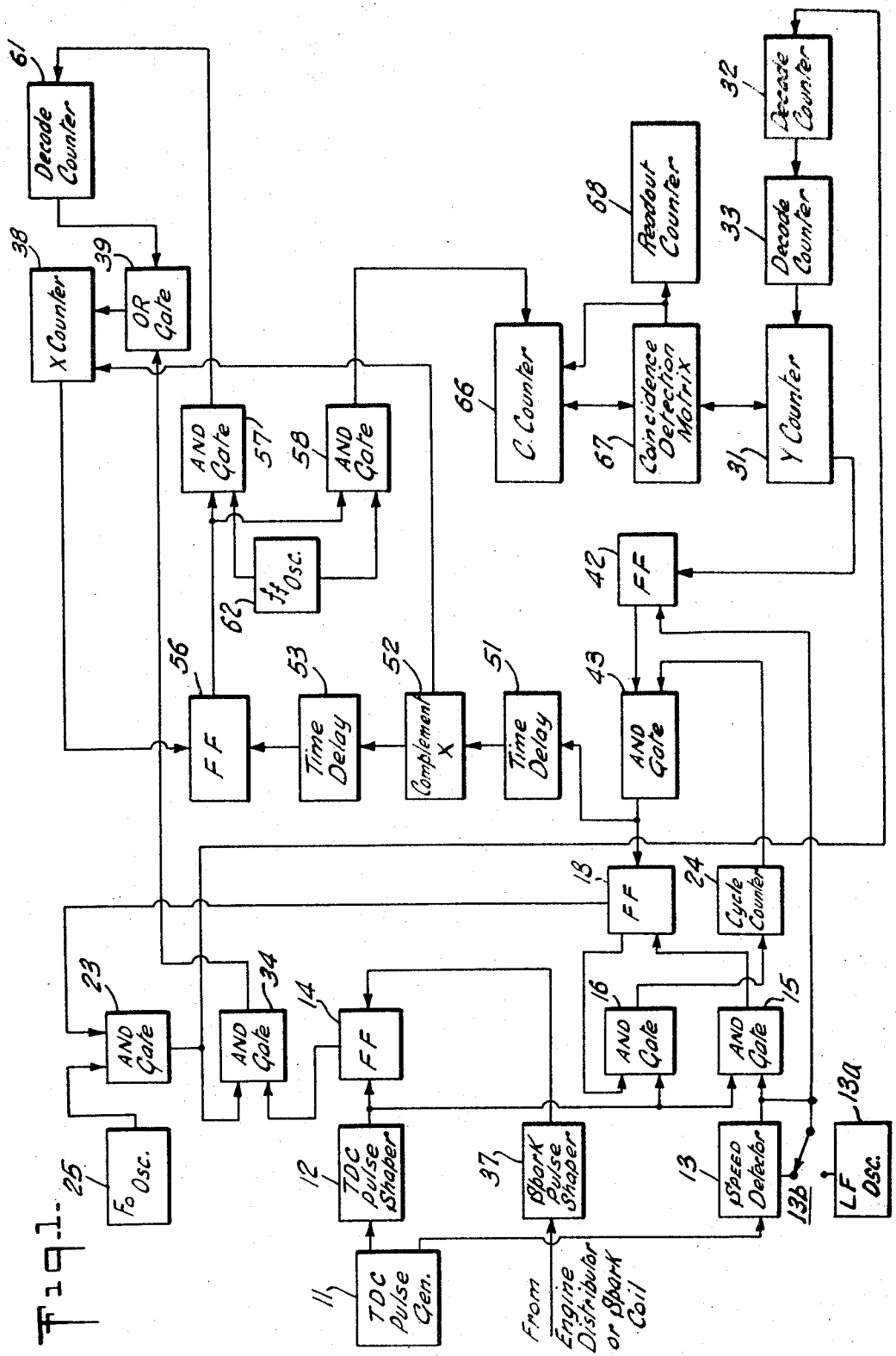

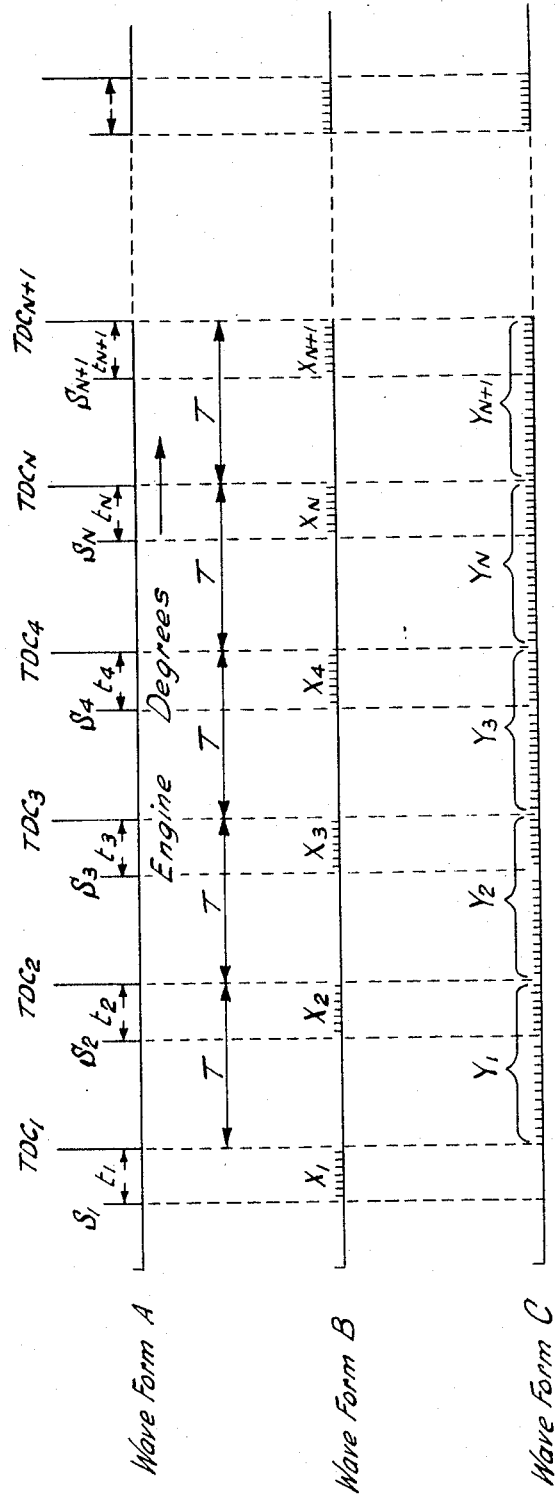

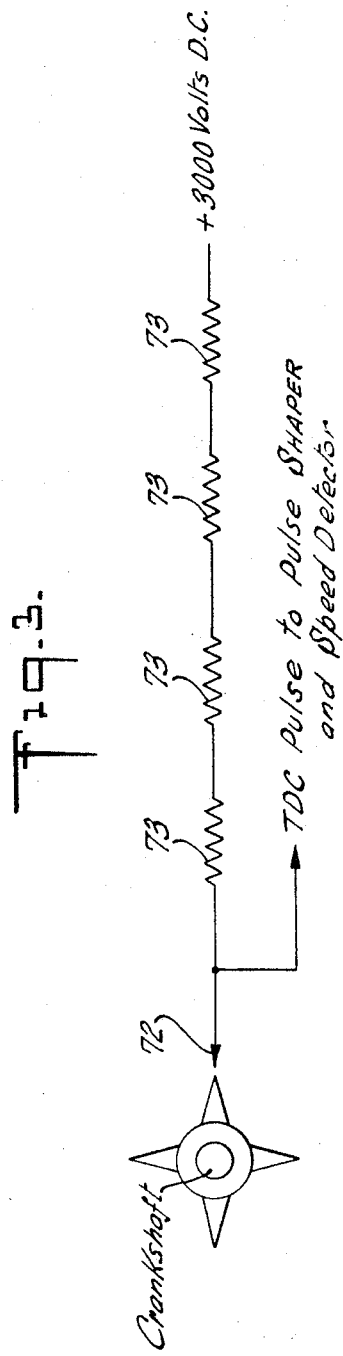
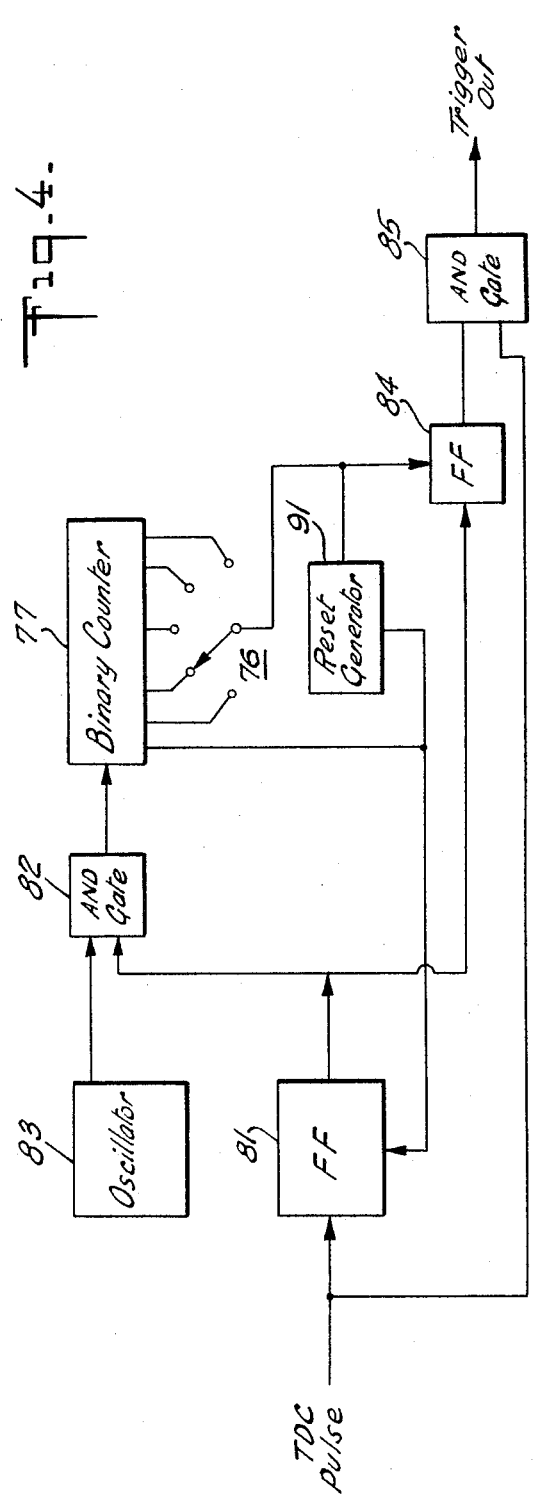

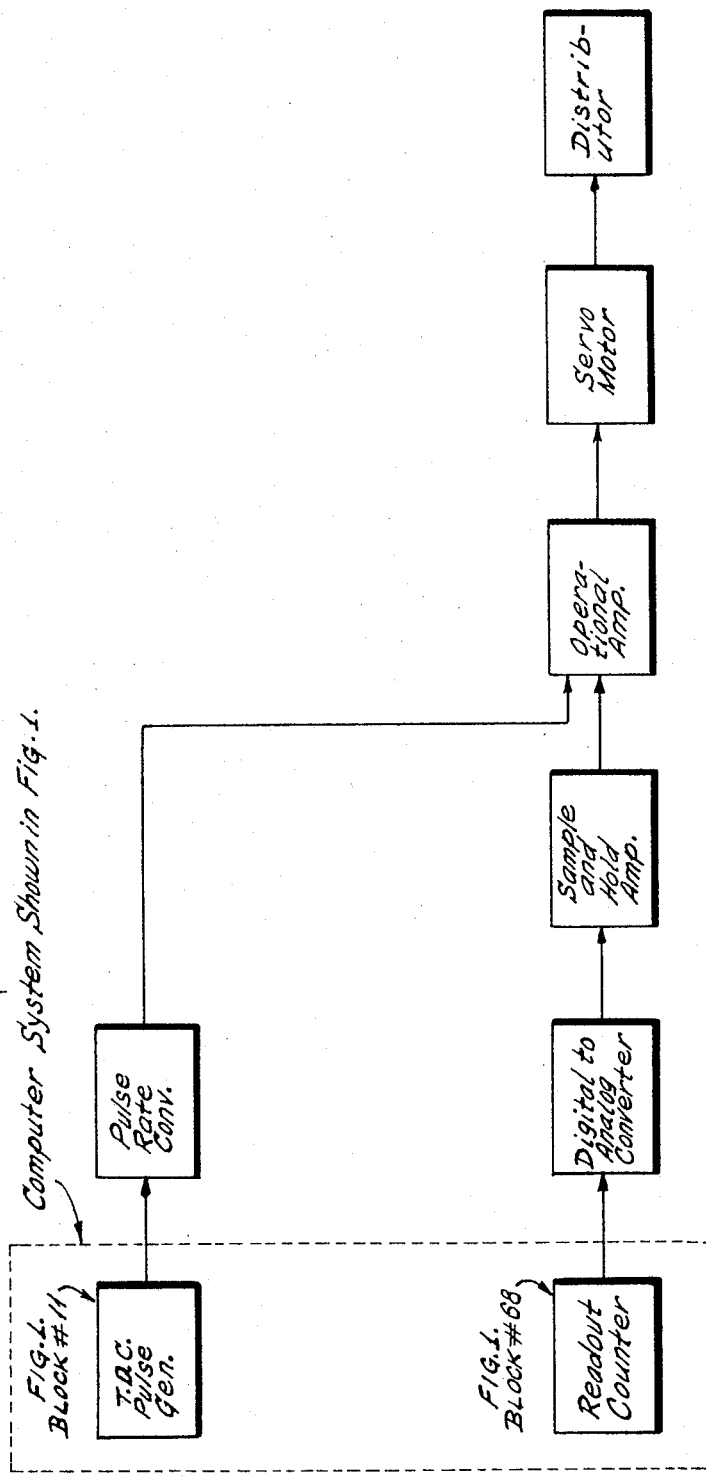

3,454,871
APPARATUS FOR MEASURING AND CONTROLLING SPARK ADVANCE OF INTERNAL COMBUSTION ENGINE
Jerry L. Nolting, Fishkill, N.Y., assignor to Texaco Inc., New York, N.Y., a corporation of Delaware
Continuation-in-part of application Ser. No. 398,888, Sept. 24, 1964. This application Feb. 19, 1968, Ser. No. 706,581
Int. Cl. G01r 13/42
U.S. Cl. 324—16      20 Claims

ABSTRACT OF THE DISCLOSURE

Apparatus for measuring the spark advance of a spark ignited internal combusion engine comprising a piston position detecting means for generating pulses in synchronism with the arrival of each piston at the top-dead-center point of travel, a speed detecting means for generating an output pulse when a predetermined speed of the engine is reached, constant frequency pulse generating means for producing pulses at a predetermined constant frequency, first control means for passing the constant frequency pulses upon receiving the first top-dead-center pulse following the output from the speed detecting means. First counter means are provided for summing the constant frequency pulses passed by the control means and for producing an output therefrom for resetting the control means to terminate the passage of the constant frequency pulses when a predetermined number of pulses corresponding to the summation of pulses between the top-dead-center pulses are counted. Further means are provided for generating a spark pulse at the time of each ignition spark of the engine. Second control means, are provided to pass said constant frequency pulses during intervals determined by the receipt of each spark pulse and the receipt of the next succeeding top-dead-center pulse. Second counting means are provided for summing the constant frequency pulses passed by the second control means which, in turn, is effective to terminate the summing of the constant frequency pulses simultaneously with the termination of the summing of constant frequency pulses in the first counting means. Further means are provided for dividing the count accumulated in the second counter means by the count summed in the first counter means in order to provide a quotient that is proportional to the average spark advance in the engine.

In a further embodiment the spark advance measurement is employed to control spark advance by means of a servo system coupled to the distributor of the engine.

CROSS REFERENCES TO RELATED APPLICATIONS

This application is a continuation-in-part of application Ser. No. 398,999, filed Sept. 24, 1964, and now abandoned.

BACKGROUND OF THE INVENTION

Field of the invention

This invention relates to apparatus for the measurement of the spark advance in an internal combustion engine and more particularly, to a computer capable of measuring the spark advance in a spark ignited internal combustion engine more accurately and at higher speeds.

Ignition timing is an important factor in the efficient operation of internal combustion engines. Any variation in ignition timing varies the amount of the charge burned before and after the top-dead-center position of the piston, the optimum spark timing resulting in the maximum efficiency, since the fuel is burned at the highest mean expansion ratio. This invention provides apparatus capable of accurately measuring the spark advance of an internal combustion engine under operating conditions accurately and at high speeds.

Description of the prior art

Commercially available spark advance detecting instruments for internal combustion engines have been found to provide measurements having an accuracy of about ±2°. The time constant associated with these instruments has been found to be of the order of 1 to 2 seconds which can provide errors of 5 to 10° under conditions of rapid engine acceleration. Changing the spark advance of an engine by 1° can change the octane requirement of an engine more than 0.6 of an octane number. Thus, it can be seen that accurate measurement of spark advance is important, especially in connection with determining the octane of the fuel to be used in the engine.

SUMMARY OF THE INVENTION

It is the main object of the present invention to provide apparatus for measuring the spark advance of an internal combustion engine with greater accuracy and at higher speeds than has been obtained heretofore.

It is another object of the present invention to provide apparatus for measuring the spark advance of an internal combustion engine based on engine speed, spark occurrence and top-dead-center measurement of piston travel.

It is another object of the present invention to improve octane ratings of fuels by an improved measurement of the spark advance in internal combustion engines.

It is a further object of the present invention to provide apparatus capable of detecting top-dead-center of piston travel simply and with greater accuracy.

It is a further object of the present invention to provide a simple means of engine speed detection.

It is a still further object of the present invention to provide improved fuel combustion, thereby reducing emission of air pollutants from the engine.

Briefly the apparatus for measuring the spark advance in a spark ignited internal combustion engine comprises in combination a piston position detecting means for detecting the time at which a predetermined point of travel of each piston of the engine is reached, a speed detecting means for detecting when a predetermined speed of the internal combustion engine has been reached and spark detection means for detecting the time of occurrence of each ignition spark in said engine. The time differences between the successive times of reaching the predetermined point of travel of each piston after the engine reaches the predetermined speed are summed and the time differences, between the times of occurrence of the ignition sparks and the time of detecting the next succeeding predetermined point of travel of the associated piston after the engine reaches the predetermined speed are summed. The first mentioned summation is divided into the second mentioned summation to provide a quotient which is proportional to the average spark advance in the engine.

A further preferred embodiment involves the provision of means comprising a servo control system coupled to the distributor of the engine.

BRIEF DESCRIPTION OF THE DRAWING

The foregoing and other features and benefits of this invention are described below in greater detail and are illustrated in the drawings, in which:

FIG. 1 is a block diagram of the computer capable of determining the spark advance of an internal combustion engine.

FIG. 2 depicts various wave forms utilized in explaining the theory of operation of the computer of FIG. 1.

FIG. 3 depicts apparatus for detecting the top-dead-center of piston travel in an internal combustion engine.

FIG. 4 is a block diagram of the apparatus for determining the speed of an internal combustion engine.

FIG. 5 is a block diagram illustrating a servo control system coupled to the computer system of FIG. 1 for controlling spark advance at the distributor of an internal combustion engine.

Referring to FIG. 1, it can be seen that the computation performed by the computer is based on the obtaining of three values accurately from the internal combustion engine in which the spark advance is to be measured. The first value which must be accurately determined, is the measurement of the top-dead-center of travel of each of the pistons of the engine. The second value which is necessary for the computation is the measurement of the time of occurrence of the sparks. The third value is the determination of the time when the internal combustion engine reaches a particular predetermined speed.

The theory of operation and the computation to be made by the computer will be explained with reference to FIG. 2. The wave forms shown therein are drawn to a linear scale representing engine degrees of rotation. Referring to wave form A, there are shown pulses $S_1, S_2, \ldots S_{n+1}$. These pulses represent the occurrence of the sparks at the spark plugs of the internal combustion engine. The pulses $TDC_1, TDC_2, \ldots TDC_{n+1}$ represent the time at which the pistons in the cylinders associated with the spark plugs represented by spark pulses having the same numerical sub-script reach the TDC (top-dead-center) point of travel. It will be appreciated that the instantaneous spark advance is the difference in time of occurrence between a spark represented by a spark pulse and the reaching of top-dead-center by the associated piston represented by a top-dead-center pulse. Accordingly, S.A. (spark advance) is the average of degrees occurring between $S_1-TDC_1, S_2-TDC_2, \ldots S_n-TDC_n$ etc. The engine speed in r.p.m. (revolutions per minute) can be assumed constant for short periods of time and accordingly, spark advance can be expressed as a percentage of the summation of the times between the spark pulses and the associated TDC pulses divided by the summation of the times between successive TDC pulses multiplied by 100 to give the percentage value. The time difference between $S_1$ and $TDC_1$, $S_2$ and $TDC_2$, ... $S_n$ and $TDC_n$ is designated in FIG. 2 wave form A by $t_1, t_2 \ldots t_n$. Likewise, the time between TDC pulses is represented by T. The above S.A. (spark advance) expressed in percentage can be designated mathematically as follows:

$$\frac{\Sigma t}{\Sigma T} \times 100 = \text{S.A. percent}$$

As can be seen from the above equation the ratio $\Sigma t/\Sigma T$ must be solved. The ratio is solved by determining the number of fixed frequency pulses occurring in the time spans represented and performing the necessary division. Referring to FIG. 2, wave form B, constant frequency pulses X are represented which are electronically gated on by the spark pulse and gated off by the succeeding TDC pulse. It follows that $\Sigma X = f_o \times \Sigma t$: where $f_o$ is the oscillator frequency. Referring to wave form C of FIG. 2, constant frequency pulses Y are shown occurring between the successive top-dead-center pulses. Accordingly, $\Sigma Y = f_o \times \Sigma T$. Therefore, $$\frac{\Sigma t}{\Sigma T} = \frac{\frac{\Sigma X}{f_o}}{\frac{\Sigma Y}{f_o}} = \frac{\Sigma X}{\Sigma Y}$$

The ratio $\Sigma X/\Sigma Y$ represents the actual ratio which is solved in the spark advance computer.

The computation is accomplished by electronically multiplying the $\Sigma X/\Sigma Y$ ratio by 1000 to obtain the result in tenths of a percent and recording the number of times a fixed frequency ($f_t$) oscillator will produce a string of pulses equal to $\Sigma Y$ before counting to $\Sigma X$ times 1000.

Referring to FIG. 1, there is shown the computer apparatus for accumulating the necessary data and performing the computation to determine the spark advance of the engine. Assuming that all the counters are empty and that the various flip-flop circuits are in their OFF or ZERO state, the operation is as follows. The TDC pulse generator 11 produces a pulse output each time one of the pistons of the engine reaches its top-dead-center point of travel. This pulse is applied to a top-dead-center pulse shaper 12 and to a speed detector circuit 13. The details of the top-dead-center pulse generator 11 and the speed detector 13 will be explained in detail below with reference to FIGS. 3 and 4. The pulse from the TDC pulse shaper 12 is applied to both flip-flop circuit 14 and to AND gates 15 and 16. This pulse applied to flip-flop 14 has no effect thereon since as was assumed, the flip-flop is in its ZERO state and this input tends to switch the flip-flop to its ZERO state. Likewise, the pulse has no effect on AND gates 15 and 16 since these gates as their name implies require simultaneous inputs, two to each gate in this case to produce an output. Speed detector 13 provides an output to AND gate 15 whenever the speed of the engine reaches a preset value. Accordingly the next TDC pulse from TDC pulse shaper 12 will cause an output from AND gate 15 which in turn triggers flip-flop 18 to its ON or ONE state. Flip-flop 18 provides two outputs when in its ON state, one of which is applied to AND gate 23 and the other of which is applied to AND gate 16. These inputs to AND gates 23 and 16 are applied as long as flip-flop 18 is in its ONE or ON condition. Accordingly, the TDC pulse from TDC pulse shaper 12 applied to AND gate 16 will cause a pulse to be produced which is applied to cycle counter 24. Cycle counter 24 is a conventional counter which is predetermined to count to a number dependent on the number of cylinders in the particular engine in which the spark advance is being measured. The usual count will be 4, 6 or 8 for a corresponding 4, 6 or 8 cylinder engine.

As previously mentioned, one output of flip-flop 18 is applied to AND gate 23. The other input to AND gate 23 is obtained from $f_o$ oscillator 25 which produces a constant frequency pulse output, for example, 360,000 cycles per second. These pulses are passed through AND gate 23 as long as it is energized by flip-flop 18 and are applied to Y counter 31 after passing through decade counters 32 and 33. The decade counters 32 and 33 have the effect of dividing the pulse input frequency to the Y counter by 100, that is 10 each. The output of AND gate 23 is also applied to AND gate 34. The other input to AND gate 34 is obtained from flip-flop 14 which is triggered ON thereby opening AND gate 34 when a spark pulse is received by the computer from spark pulse shaper 37. Thus, the $f_o$ oscillator 25 pulses are applied to X counter 38 through OR gate 39 as long as AND gate 34 is held open by flip-flop 14. As can be seen, the application of the $f_o$ oscillator pulses to X counter 38 is intermittent since the flip-flop 14 is turned on by the spark pulses and turned off by each succeeding TDC pulse from TDC pulse shaper 12. This is consistent with the theory disclosed whenever the $f_o$ pulse correspond to the X pulses applied to X counter 38 as depicted in wave form B of FIG. 2.

After a sufficient number of pulses have been accumulated in the Y counter to insure computational accuracy, the Y counter produces a pulse output which triggers flip-flop 42 to its ON or ONE condition. The output from this flip-flop is applied to AND gate 43. Flip-flop 42 is reset to its OFF state upon receiving a pulse from speed detector 13. This insures that the flip-flop is reset at the start of the data accumulation cycle. As will be recalled the output from AND gate 16 was applied to cycle counter 24 which is a counter capable of producing an output pulse when a predetermined count equivalent to the number of cylinders in the engine is reached. That is, when 4, 6 or 8 counts are applied to cycle counter 24 equivalent to a 4, 6 or 8 cylinder engine, an output pulse will be provided which is applied as the other input to AND gate 43. Accordingly, AND gate 43 will produce an output when the outputs of flip-flop 42 and cycle counter 24 are applied thereto simultaneously. The output from AND gate 43 is applied to flip-flop 18 returning the flip-flop to its original OFF or ZERO condition, which closes AND gate 23 and stops the flow of $f_o$ pulses to the Y counter. The cycle counter 24 is utilized to turn flip-flop 18 to its OFF or ZERO condition at a whole multiple of complete engine cycles. This is desirable since the spark advance may differ from cylinder to cylinder in the engine. Thus the cycle counter 24 is turned on at the start of the data accumulation cycle and provides a signal output after each complete engine cycle only. The turning off of flip-flop 18 also removes an input to AND gate 16 and thus this gate no longer passes TDC pulses to cycle counter 24. Actually, this is the end of the accumulation cycle of the computer and now the actual computation based on accumulated data takes place.

The output of AND gate 43 is also applied to time delay 51 which triggers the time delay which is long enough to allow the circuitry to settle down. At the end of the predetermined time delay, an output pulse is applied to a complement circuit 52 which causes the count stored in counter X to be complemented. The result of this step is that the counter is in a condition to overflow after receiving a number of pulses equivalent to the count which was in the counter at the time of complementing. This technique is well known in the art and is not believed to require any further explanation herein. The output of complement circuit 52 is also applied to time delay circuit 53 whose output at the end of a predetermined time delay triggers flip-flop 56 to its ON condition. The delay provides the time necessary for the complementing of the counter. The output of flip-flop 56 is applied to AND gate 57 and AND gate 58 predisposing these gates for operation when an input is received at the other inputs thereto. The inputs to these other inputs are obtained from $f_o$ oscillator 62 which provides pulses at a predetermined constant frequency which pass through AND gates 57 and 58. The pulses passing thru AND gate 57 are applied to a decade counter 61 which after counting 10 pulses provides an output which passes through OR gate 39 into X counter 38. Accordingly, every tenth pulse from $f_t$ oscillator 62 is utilized in counter 38 to count to the predetermined value preset therein. Connecting decade counter 61 to produce a pulse output at each ten pulses is the equivalent of multiplying the time it takes the X counter to reach a count equivalent to the original count in the counter by ten, that is, the count in the counter before complementing took place.

In essence the decade counters 32, 33 preceding the Y counter and the decade counter 61 associated with the X counter have effectively multiplied the ratio $\Sigma X/\Sigma Y$ by 1000 as was mentioned in the preceding theory of operation. For example, assuming $f_o$ to be 360,000 c.p.s., then the Y counter will theoretically contain 3600 counts after one second. The decade counters 32, 33 preceding the Y counter have effectively divided the frequency by 100, 10 each decade counter. The X counter during the equivalent time period counts 360,000 pulses. When the pulses from the $f_t$ oscillator are applied to the X counter thru decade counter 61 after the X counter has been complemented, the decade counter has the effect of multiplying by 10. That is, the counter overflows after counting 360,000 pulses however it has taken 3,600,000 pulses from the $f_t$ oscillator. Accordingly, it can be seen that the decade counters have effectively multiplied the ratio $\Sigma X/\Sigma Y$ by 1000.

The output from AND gate 58 is counted in C counter 66. This counter is connected to Y counter 31 through a coincidence detection matrix 67 which, when the count in C counter 66 reaches the equivalent count stored in Y counter 31, produces a pulse which empties C counter and records one pulse in read-out counter 68. This process of injecting, comparing, resetting and injecting is repeated until an output is obtained from the X counter which turns off flip-flop 56 which in turn closes AND gates 57 and 58. The count accrued in the read-out counter 68 now corresponds to the actual spark advance of the engine. The process of determining how many times the count in the Y counter can be repeated before the X counter reaches its predetermined preset count results in the division of the count in the X counter by the count in the Y counter.

The read-out counter 68 records the number of times the fixed frequency $f_t$ oscillator produces a string of pulses equal to $\Sigma Y$ before counting to $\Sigma X$ x 1000. Since it may be desirable to express the read-out directly in degrees rather than as a percentage, the oscillator frequency may be selected such that the injection of pulses into the X and Y counters are not at the same frequency, but rather chosen to fit the ratios 100/90, 100/120 and 100/180 for 8, 6 or 4 cylinder engines respectively. This effectively would multiply the percentage ratios for the 8, 6 and 4 cylinder engine by 90, 120 and 180, respectively, to give the read-out directly in degrees.

The TDC pulse generator 11 shown in block form in FIG. 1 is shown in more detail in FIG. 3. The determination of the top-dead-center of travel of the piston is obtained by monitoring a star shaped member attached to the front of the fly wheel. The ends of the star are arranged to pass a probe 72 at the time the corresponding piston is at its top-dead-center point of travel. The probe 72 is connected to a high DC voltage source, i.e. 3000 volts, which provides sufficient voltage such that the passing of the tip of the star of the disc past the probe will cause a spark to jump the gap at exactly TDC. The star is three sided for a 6 cylinder engine, 4 sides for an eight cylinder engine and 2 sides for a 4 cylinder engine. Resistors 73 are connected in the high voltage line to provide current limitation to eliminate shock hazard. The pulse obtained at the probe is detected and shaped by conventional means such as a multi-vibrator.

The speed detector circuit 13 depicted in FIG. 1 is shown in more detail in FIG. 4. This circuit is designed to provide an output pulse to the data accumulation section of the computer during an engine acceleration cycle when the speed of the engine reaches a preselected value. The technique utilized is to compare the time of occurrence of the engine TDC pulses with the time of occurrence of the pulses of a standard clock pulse source. When the time period of the TDC pulses is less than the standard clock time period selected, an output will occur. Accuracy is greater than 1%. The standard time period is selected by means of a switch 76 which selects the count at which an output from a binary counter 77 will be obtained.

Assuming that the engine speed is lower than the speed selected by switch 76, and that all flip-flops are in the OFF condition and that the counter has been reset, the operation will be as follows. The first arriving TDC pulse will trigger flip-flop 81 to its ON condition. This flip-flop in turn, produces an output which is applied to AND gate 82 which allows the pulses from oscillator 83 to pass therethrough and be counted in binary counter 77. The flip-flop 81 also provides an output which is applied to a second flip-flop 84 which in turn provides an output to AND gate 85. When the counter reaches the count to which the switch 76 has been preset, an output will be obtained through the switch triggering flip-flop 84 to its OFF condition. This closes AND gate 85 and provides a pulse to reset generator 91 which resets flip-flop 81 to its OFF condition and also resets the binary counter 77. Thus, it can be seen that no output was obtained from AND gate 85. The next incoming TDC pulse will trigger flip-flop 81 to its ON condition and the cycle will be repeated. As the engine speed increases, the TDC pulse separation will decrease until a TDC pulse occurs before AND gate 85 is closed by flip-flop 84. Accordingly, this TDC pulse will pass through AND gate 85 triggering the data accumulation circuitry of the computer.

The apparatus described herein is capable of detecting the average engine spark advance within a period of approximately 0.2 of a second. The actual computation and display of the spark advance adds another 0.5 of a second. Accuracy of the instrument is approximately +0 −0.2° at 90° spark advance increasing to +0 −0.1° at 45° spark advance or less.

Referring now to FIG. 5 there is shown a servo control system for controlling spark advance at the distributor of an internal combustion engine as a function of spark advance measurement provided by the apparatus illustrated in FIG. 1, which is described in detail above, and which is illustrated within the dashed box of FIG. 5 containing the top-dead-center pulse generator No. 11 and the readout counter 68.

The servo control system of FIG. 5 can be employed with the spark advance computer of FIG. 1 to produce a linear change in spark advance with engine speed. The system of FIG. 5 includes a pulse rate converter coupled to the output of the top-dead-center pulse generator No. 11 for converting frequency to voltage in order to provide analog voltage signal versus speed, which in turn, is connected to a subtractor circuit comprising an operational amplifier and which is so designated. A digital to analog converter is coupled to the readout counter 68. (Attached to the SAC readout decades in the illustrated embodiment) to provide an analog voltage proportional to spark advance which is, in turn, coupled through a sample and hold amplifier to the subtractor circuit comprising the aforesaid operational amplifier. The output of the operational amplifier, which functions to provide a signal that is a function of the difference between the respective outputs of the pulse rate converter and the digital to analog converter, is in turn coupled to a servo motor for controlling the spark advance at the distributor. In the ordinary case, such a servo motor would control the rotary position of the distributor which controls or determines the spark advance thereof.

In the illustrated embodiment such an operation would ordinarily involve a subtraction of the pulse rate signal from the digital to analog converter signal in the operational amplifier to provide an error signal which would be employed to drive the servo motor controlling the spark advance position of the distributor and which would function to change the spark advance in such a direction as to eliminate the voltage difference between that supplied by the pulse rate converter and that supplied by the digital to analog converter. Thus, the servo system would be a nulling type system in the preferred embodiment.

Since the SAC readout decade signal of the illustrated embodiment is intermittently interrupted when computing spark advance, the sample and hold amplifier is provided between the digital to analog converter and the subtractor circuit comprising the operational amplifier.

Since spark advance is normally modified by other engine variables such as manifold vacuum, provision may be made to include manifold vacuum as a measured parameter by installing a manifold pressure to voltage converter on the engine to provide a signal that is a function of manifold vacuum. It is contemplated that the signal corresponding to manifold vacuum may then be combined with the signal produced by the pulse rate converter illustrated in FIG. 5 before comparison with the digital to analog converter signal, thereby providing a further control parameter for the engine.

It will be appreciated that although linear functions have been described in the foregoing embodiments, non-linear curves may be obtained for control purposes by installation of function generators when desired. For example, it may be desirable in the case of a particular internal combustion engine to use a logarithmic function generator in one of the analog signal paths coupled to the input of the subtractor circuit including the operational amplifier shown in FIG. 5. This would provide control of spark advance at the distributor as a logarithmic function of the measured engine speed.

Particularly when controlling spark advance as described above it may be desirable to increase the speed of spark advance computation. This may be accomplished by removal of one decade counter (FIG. 1, block 32) which would increase speed of spark advance computation by a factor of ten (10) but would also reduce accuracy by the same factor. Speed of computation may also be increased without reduction of accuracy by increasing the fixed frequency oscillator speed (FIG. 1, block 62).

In order to provide a continuous control of the spark advance by means of the servo control system such as that of FIG. 5, it is necessary to proivde a continuous measurement of spark advance. Since the speed detector apparatus 13 of FIG. 1 will only give a value of spark advance at seletced speeds a low frequency oscillator is provided for use in lieu of the speed detector 13 to continuously recycle the computer in a manner hereinafter described.

In the apparatus of FIG. 1 the switch 13B is shown in the upper position whereby the output of the speed detector 13 is coupled to the input of the AND gate 15 and to the input of the flip-flop 42 to provide a mode of operation as described above with respect to FIG. 1. Another mode of operation is provided for FIG. 1 by selecting the lower position of the switch 13B such that the output of the low frequency oscillator 13A is coupled to the input of the AND gate 15 and to the input of the flip-flop 42, while the output of the speed detector 13 is disconnected.

The second mode of operation of the apparatus of FIG. 1, namely, that involving connection of the low frequency oscillator 13A to the AND gate 15 and the flip-flop 42 is to be preferred in the embodiment of the invention involving the use of a servo control system for controlling spark advance as illustrated in FIG. 5, wherein FIG. 1 is incorporated within the dashed box designated Computer System shown in FIG. 1.

The low frequency oscillator 13A may be a known type of oscillator such as a free running multivibrator capable of providing relatively low frequency output pulses for triggering the AND gate 15 and the flip-flop 42 at a rate which determines the spark advance measurement frequency, e.g. the sampling rate of the computer. While the actual sampling rate may vary according to the particular engine being controlled, a typical sampling rate may be in the range of one to ten cycles per second, for example.

I claim:

1. Apparatus for measuring the spark advance in a spark ignited internal combustion engine, comprising top-dead-center pulse generating means for producing a pulse at the top-dead-center point of travel of each piston of said engine, speed detecting means for generating an output when a predetermined speed of the internal combustion engine is reached, constant frequency pulse generating means for producing pulses at a predetermined constant frequency, first control means for passing said constant frequency pulses upon receiving the first top-dead-center pulse following the output from said speed detecting means, first counter means for summing said constant frequency pulses passed by said control means and for producing an output therefrom resetting said control means to terminate the passage of said constant frequency pulses when a predetermined number of pulses corresponding to the summation of pulses between said top-dead-center pulses are counted, means for generating a spark pulse at the time of each ignition spark of the engine, second control means adapted to pass said constant frequency pulses during intervals determined by the receipt of each spark pulse and the receipt of the next succeeding top-dead-center pulse, second counting means for summing said constant frequency pulses passed by said second control means, said second control means terminating the summing of constant frequency pulses simultaneously with the termination of the summing of constant frequency pulses in said first counting means and means for dividing the count accumulated in said second counter means by the count summed in said first counter means, the quotient being proportional to the average spark advance in the engine.

2. Apparatus according to claim 1, wherein said first control means comprises a first and second gating means and a first and second switching means, said first gating means providing an output upon the simultaneous receipt of outputs from said speed detection means and said top-dead-center pulse generating means, the output from said first gating means energizing said first switching means so as to produce an output which is applied to said second gating means, said second gating means passing each constant frequency pulse applied thereto as long as the input from said first switching means is energized, said second switching means being connected to said first counter means and said first switching means and being adapted to deenergize said first switching means upon the receipt of an output from said first counter means.

3. Apparatus according to claim 1, wherein said second control means comprises gating means and a switch means, said switch means being energized so as to produce an output upon the receipt of each spark pulse from said engine and being deenergized upon the receipt of each next succeeding top-dead-center pulse from said top-dead-center pulse generator, said gating means passing constant frequency pulses passed by said first control means only when the input to said gating means from said switching means is energized.

4. Apparatus according to claim 1, comprising cycle counting means for counting said top-dead-center pulses and producing an output therefrom after a number of pulses determined by the number of cylinders in said engine have been counted, said output from said cycle counting means determining the termination of passage of constant frequency pulses by said first control means when the first counter means has reached the predetermined count and produced an output therefrom, said cycle counter means ensuring that the number of constant frequency pulses passed represents a whole number of engine cycles.

5. Apparatus according to claim 2, comprising cycle counting means including third and fourth gating means and a cycle counter, said third gating means has an input thereto from said first switching means and an output connected to said cycle counter, a further input to said third gating means provides top-dead-center pulses thereto, said third gating means passing said top-dead-center pulses to said cycle counter when the input thereto from said first switching means is energized, said cycle counter counting said passed top-dead-center pulses from said third gating means and providing an output when the predetermined count of the cycle counter is reached, said fourth gating means having one input thereof connected to the output of said cycle counter and another input connected to the second switching means, the output of said fourth gating means being connected to said first switching means, the output from said cycle counter coincident at the input to said fourth gating means circuit with the output of said second switching means producing an output from said fourth gating means which deenergizes said first switch means thereby terminating the passage of said constant frequency pulses.

6. Apparatus according to claim 1, wherein said dividing means comprises second constant frequency pulse generating means, means for complementing the count accumulated in said second counter means, third counter means for accumulating a count of said second constant frequency pulses, a coincidence detection matrix connected between said third counter means and said first counter means, said coincidence detection matrix producing a coincidence pulse each time there is coincidence between the count accumulated in said third counter means and said first counter means, each coincidence pulse providing resetting of said third counter means to its zero count condition, read-out counter means for counting the number of coincidence pulses, means for terminating said second constant frequency pulses when the number thereof is equivalent to the count to which said second counter has been set to count by said means for complementing, the number of coincidence pulses accumulated in said read-out counter being the quotient of said division.

7. Apparatus according to claim 1, wherein the first counter means is preceded by a first and second decade counter connected in series which effectively divide the frequency of the constant frequency pulses accumulated in said first counter means by 100 thereby causing the quotient to be in terms of percent spark advance.

8. Apparatus according to claim 7, wherein a third decade counter is provided for dividing the frequency of said second constant frequency pulses by 10 before they are counted in said second counting means, said first, second and third decade counters effectively dividing the frequencies of said first and second constant frequency pulses so that the ratio of the number of pulses accumulated in said second counting means and the number of pulses accumulated in said first counting means is effectively multiplied by 1000 thereby causing the quotient to be in terms of tenths of a percent.

9. Apparatus according to claim 1, wherein said top-dead-center pulse generating means comprises a star shaped member attached to the flywheel of said engine and a probe connected to a high voltage source, said star shaped member being arranged to have a point of the star pass close to said probe at the exact top-dead-center point of travel of each of said pistons to cause a spark to jump the gap therebetween to produce said top-dead-center pulses.

10. Apparatus according to claim 1, wherein said speed detecting means comprises a fixed frequency oscillator, a binary counter for counting pulses from said fixed frequency oscillator, a time period selection switch associated with said counter which is normally set to the position corresponding to the desired predetermined speed, and selective output means for generating an output when the time period between top-dead-center pulses becomes less than the selected time period thereby indicating the engine has reached the predetermined speed.

11. Apparatus according to claim 10, wherein said selective output means comprises a first switch means triggered by the first input top-dead-center pulse to produce an output therefrom, a first and second gating means and a second switch means, said output from said first switch means predisposing said first gating means to pass pulses applied thereto from said fixed frequency oscillator to said binary counter, said output from said first switch means also energizing said second switch means to produce an output predisposing said second gating means to pass subsequent top-dead-center pulses applied thereto, said speed selection switch providing an output when the pulses from said fixed frequency oscillator counted in said binary counter reach the count preselected by said selecting switch, said output from said speed selection switch deenergizing said second switch means thereby preventing subsequent top-deadcenter pulses from passing through said second gating means, said output from said speed selection switch also energizing a reset means to reset said binary counter to its zero count and to trigger said first switch means to its deenergized condition.

12. Apparatus for measuring the spark advance in a spark ignited internal combustion engine, comprising top-dead-center pulse generating means for producing a pulse at the top-dead-center point of travel of each piston of said engine, speed detecting means for generating an output when a predetermined speed of the internal combustion engine is reached, constant frequency pulse generating means for producing pulses at a predetermined constant frequency, first and second gating means and first and second switching means, said first gating means providing an output upon the simultaneous receipt of outputs from said speed detecting means and said top-dead-center pulse generating means, the output from said first gating means energizing said first switching means so as to produce an output which is applied to said second gating means, said second gating means passing each constant frequency pulse applied thereto as long as the input connected to said first switching means is energized, first counter means for counting said constant frequency pulses passed by said second gating means and for producing an output therefrom when a predetermined number of pulses corresponding to the summation of pulses between said top-dead-center pulses are counted, said second switching means being connected to said first counter means and said first switching means and being adapted to deenergize said first switching means upon the receipt of an output from said first counter means, means for generating a spark pulse at the time of each ignition spark of the engine, a third gating means and third switch means, said third switch means being energized so as to produce an output upon the receipt of each spark pulse from said engine and being deenergized upon the receipt of each next succeeding top-dead-center pulse from said top-dead-center pulse generator, said third gating means passing constant frequency pulses passed by said second gating means only when the input to said third gating means from said third switching means is energized, second counting means for accumulating said constant frequency pulses passed by said third gating means, and means for dividing the count accumulated in said second counter means by the count accumulated in said first counter means, the quotient being proportional to the average spark advance in the engine.

13. Apparatus for measuring the spark advance in a spark ignited internal combustion engine, comprising in combination piston position detecting means for detecting the time at which a predetermined point of travel of each piston of said engine has been reached, speed detecting means for detecting when a predetermined speed of the internal combustion engine has been reached, first summing means for adding digital pulses indicative of the time differences between the successive times at which said predetermined point of travel of each piston of said engine is reached after the predetermined speed of the internal combustion engine has been reached, spark detection means for detecting the time of occurrence of each ignition spark in said engine, second summing means for adding digital pulses indicative of the time differences between the occurrence of each ignition spark and the next succeeding time of reaching of the predetermined point of travel of the associated piston after the predetermined speed of the internal combustion engine has been reached, dividing means for dividing the sum in said second summing means by the sum in said first summing means, the quotient being proportional to the average spark advance in the engine.

14. Apparatus according to claim 13, wherein constant frequency pulse generating means are provided for producing pulses at a predetermined constant frequency, said first and second summing means adding said pulses occurring during said time differences to provide a count therein proportional to said time differences.

15. A speed detecting apparatus for an engine comprising engine speed pulse generating means for producing pulses which vary in frequency in correspondence to change in engine speed, including piston position detecting means for producing piston position pulses having a predetermined time relationship with the arrival of each piston in the engine at its top-dead-center point of travel, a fixed frequency oscillator for generating fixed frequency pulses, a counter coupled to said oscillator for counting said fixed frequency pulses, a normally closed first gate coupled in circuit between said oscillator and said counter for controlling the transmission of pulses from said oscillator to said counter, said first gate having an input-control circuit responsive to said position pulses whereby said first gate is repetitively opened in synchronism with the occurrence of said position pulses, means comprising a time period selection switch associated with said counter for determining the count at which the counter will produce output pulses, and selective engine speed output means including normally opened second gate means responsive to said piston position pulses for generating an output signal, said second gate means having an input-control circuit responsive to the output of said counter for closing said second gate in response to an output from said counter whereby said second gate means generates an output signal in response to said piston pulses only when the time period between successive piston position pulses is less than the time period selected by said time period selection switch, thereby indicating that the engine has reached a predetermined speed.

16. A speed detecting apparatus for an engine comprising engine speed pulse generating means for producing pulses which vary in frequency in correspondence to change in engine speed, including piston position detecting means for producing piston position pulses having a predetermined time relationship with the arrival of each piston in the engine at its top-dead-center point of travel, a fixed frequency oscillator for generating fixed frequency pulses, a counter coupled to said oscillator for counting said fixed frequency pulses, a normally closed first gate coupled in circuit between said oscillator and said counter for controlling the transmission of pulses from said oscillator to said counter, said first gate having an input-control circuit responsive to said position pulses whereby said first gate is repetitively opened in synchronism with the occurrence of said position pulses, means comprising a time period selection switch associated with said counter for determining the count at which the counter will produce output pulses, and selective engine speed output means including normally opened second gate means responsive to said piston position pulses for generating an output signal, said second gate means having an input-control circuit responsive to the output of said counter for closing said second gate in response to an output from said counter whereby said second gate means generates an output signal in response to said piston pulses only when the time period between successive piston position pulses is less than the time period selected by said time priod slection switch, threby indicating that the engine has reached a predetermined speed, said apparatus further comprising first switch means having an input coupled to said piston position detecting means and a second switch means having an input coupled to the output of said counter, an output from said first switch means being coupled to the input-control circuit of said first gating means for predisposing said first gating means to pass pulses applied thereto from said fixed frequency oscillator to said counter, said output from said first switch means also being coupled to the control circuit of said second switch means for energizing said second switch means to produce an output predisposing said second gating means to pass subsequent engine speed pulses applied thereto, said time period selection switch providing an output when the pulses from said fixed frequency oscillator counted in said counter reach the count preselected by said selection switch, said output from said time period selection switch de-energizing said second switch means thereby preventing subsequent engine speed pulses from passing through said second gating means, said output from said speed selection switch also energizing a reset means to reset said counter to its zero count and to trigger said first switch means to its de-energized condition.

17. Apparatus for measuring the spark advance in a spark ignited internal combustion engine, comprising in combination piston position detecting means for detecting the time at which a predetermined point of travel of at least one piston of said engine has been reached, means comprising a low frequency oscillator for providing computer sampling rate trigger pulses first summing means for adding digital pulses indicative of the time difference between the time at which said predetermined point of travel of said engine is reached after the occurrence of each of said trigger pulses from said low frequency oscillator, spark detection means for detecting the time of occurrence of each ignition spark for the cylinder containing said piston in said engine, second summing means for adding digital pulses indicative of the time difference between the occurrence of each said ignition spark for said cylinder and the next succeeding time of reaching the predetermined point of travel of the associated piston after the occurrence of a corresponding one of said trigger pulses from said low frequency oscillator, dividing means for dividing the sum in said second summing means by the sum in said first summing means and for generating a signal proportional to the spark advance in said engine and signal utilization means coupled thereto.

18. Apparatus as defined in claim 17 wherein said signal utilization means comprises a closed loop servo control system for controlling the spark advance of said engine.

19. Apparatus as defined in claim 18 wherein said closed loop servo control system is coupled to the distributor of said engine for controlling the spark advance thereof.

20. Apparatus as defined in claim 18 wherein closed loop servo system comprises means for controlling spark advance of said engine by comparing a signal obtained by computing spark advance with a signal representing the desired spark advance and further comprises means for utilizing the error signal so obtained to control engine spark advance.

References Cited

UNITED STATES PATENTS

| | | | |
|---|---|---|---|
| 3,020,897 | 2/1962 | Sekine | 123—148 |
| 3,022,461 | 8/1964 | Wilcox | 324—82 |
| 3,146,432 | 8/1964 | Johnson | 324—70 |
| 3,153,746 | 10/1964 | Atkinson | 324—70 |
| 3,184,976 | 5/1965 | Greiner | 324—83 |
| 3,229,203 | 1/1966 | Minohara | 324—68 |
| 3,338,221 | 8/1967 | Scholl | 123—119 |

FOREIGN PATENTS 814,323  6/1959  Great Britain.

RUDOLPH V. ROLINEC, *Primary Examiner.*

MICHAEL J. LYNCH, *Assistant Examiner.*

U.S. Cl. X.R.

73—118; 123—117.1, 148; 324—68, 70